(12) United States Patent
Crews

(10) Patent No.: US 7,645,724 B2
(45) Date of Patent: Jan. 12, 2010

(54) COMPOSITIONS AND USE OF MONO- AND POLYENOIC ACIDS FOR BREAKING VES-GELLED FLUIDS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 413 days.

(21) Appl. No.: 11/373,044

(22) Filed: Mar. 10, 2006

(65) Prior Publication Data

US 2006/0211776 A1    Sep. 21, 2006

Related U.S. Application Data

(60) Provisional application No. 60/662,336, filed on Mar. 16, 2005.

(51) Int. Cl.
*C09K 8/68*   (2006.01)
(52) U.S. Cl. .................. 507/203; 507/239; 507/240; 507/252; 507/266; 507/269; 166/308.2; 166/308.3
(58) Field of Classification Search ................. 516/194; 507/267
See application file for complete search history.

(56) References Cited

U.S. PATENT DOCUMENTS

| | | | | |
|---|---|---|---|---|
| 3,813,345 | A * | 5/1974 | Urton | 516/54 |
| 4,813,482 | A * | 3/1989 | Walton | 166/267 |
| 6,248,699 | B1 * | 6/2001 | Subramanian et al. | 507/265 |
| 6,395,778 | B1 | 5/2002 | Luthria | |
| 6,846,942 | B2 | 1/2005 | Rubin | |
| 6,881,709 | B2 | 4/2005 | Nelson et al. | |
| 2002/0004464 | A1 * | 1/2002 | Nelson et al. | 507/200 |
| 2004/0152604 | A1 | 8/2004 | Qu et al. | |
| 2006/0165735 | A1 * | 7/2006 | Abril et al. | 424/401 |

FOREIGN PATENT DOCUMENTS

| | | |
|---|---|---|
| GB | 2368602 A | 8/2002 |
| WO | 01/77487 A2 | 10/2001 |
| WO | 02/064946 A1 | 8/2002 |
| WO | 2004/007904 A1 | 1/2004 |
| WO | 2004/057155 A1 | 7/2004 |

OTHER PUBLICATIONS

U.S. Appl. No. 11/849,780, filed Sep. 4, 2007, Crews et al.
U.S. Appl. No. 11/849,799, filed Sep. 4, 2007, Crews et al.
A. L. Lehninger, Biochemistry: Second Edition, Mar. 1977, pp. 280-285, Worth Publishers, Inc., New York.
G. Haase, et al., Abstract for "Ascorbic Acid and Copper in Linoleate Oxidation. II. Ascorbic Acid and Copper as Oxidation Catalysts," Journal of Lipid Research, Sep. 1969, vol. 10.
S. W. Huang, et al., "Antioxidant Activity of alpha- and gamma-Tocopherols in Bulk Oils and in Oil-in-Water Emulsions," J. Agric. Food Chem., 1994, pp. 2108-2114, vol. 42, American Chemical Society.
F. Shahidi, et al. "Stabilization of Canola Oil by Natural Antioxidants", ACS Symposium Series, 1994, pp. 174-188, vol. 558, USA.
B. R. Stewart, et al., "Use of a Solids-free Viscous Carrying Fluid in Fracturing Applications: An Economic and Productivity Comparison in Shallow Completions," SPE 30114, European Formation Damage Control Conference, May 15-16, 1995, pp. 379-392, The Hague, Netherlands.
S. W. Huang, et al., "Effects of Individual Tocopherols and Tocopherol Mixtures on the Oxidative Stability of Corn Oil Triglycerides," J. Agric. Food Chem., 1995, pp. 2345-2350, vol. 43, American Chemical Society.
J. E. Brown, et al., "Use of a Viscoelastic Carrier Fluid in Frac-Pack Applications," SPE 31114, SPE Formation Damage Symposium, Feb. 14-15, 1996, pp. 439-448, Layfayett, LA, USA.
AAL Reference Laboratories, "An Objective Evaluation of Antioxidant Protection Capacity and Free Radical Damage Assessment," Oxidative Protection Technical Bulletin, 1996. Available from: http://www.aal.xohost.com/OPSTB.htm.
Dept. Of Chem. Eng., Inst. Sup. Tecnico, Lisbon, Portugal, "Chemical Reactions of Oil, Fat and Fat Based Products," Oct. 1997. Available from: http://journeytoforever.org/biofuel_library/chemoils/html.
H. H. F. Refsgaard, et al., "Sensory and Chemical Changes in Farmed Atlantic Salmon (*Salmo salar*) during Frozen Storage," J. Agric. Food Chem., 1998, pp. 3473-3479, vol. 46, American Chemical Society.
BASF, "Keeping Current: Natural-Derived Antioxidants: Science or Marketing: KC 9506," 1999, BASF Fine Chemicals.
"Freshwater Fish Source of Omega 3-Fatty Acids," Tribal Fishing, Oct. 1999, Chippewa Ottawa Treaty Fishery Management Authority. Available from: http://www.1836cora.org/pdf/freshwaterfishbenefits.pdf.
G. Inchbald, "Fat Content and Fatty Acid Composition of Seeds and Seed Oils," Sep. 29, 2000. Available from: http://www.queenhill.demon.co.uk/seedoils/omegas.pdf.
O. Blokhina, et al., "Antioxidants, Oxidative Damage and Oxygen Deprivation Stress: A Review," Annals of Botany, 2002, pp. 179-194, vol. 91, Annals of Botany Company.
E. C. Suloff, "Sorption Behavior of an Aliphatic Series of Aldehydes in the Presence of Poly(ethylene terephthalate) Blends Containing Aldehyde Scavenging Agents", Dissertation, Nov. 21, 2002, pp. 4-28, Virginia Tech, Food Science and Technology Department. Available from: http://scholar.lib.vt.edu/theses/available/etd-12042.

(Continued)

*Primary Examiner*—Timothy J. Kugel
*Assistant Examiner*—Atnaf Admasu
(74) *Attorney, Agent, or Firm*—Mossman Kumar & Tyler PC

(57) ABSTRACT

Fluids viscosified with viscoelastic surfactants (VESs) may have their viscosities reduced (gels broken) by the direct or indirect action of a composition that contains at least one unsaturated fatty acid, such as a monoenoic acid and/or polyenoic acid. The unsaturated fatty acid may be contained in an oil-soluble internal phase of the fluid. The breaking composition is believed to act possibly by rearranging, disaggregating or otherwise attacking the micellar structure of the VES-gelled fluid. In a specific, non-limiting instance, a brine fluid gelled with an amine oxide surfactant can have its viscosity broken with an oil such as flax (linseed) oil, soybean oil and/or fish oils containing relatively high amounts of unsaturated fatty acids. The unsaturated fatty acids are thought to auto-oxidize into products such as aldehydes, ketones and saturated fatty acids that break the VES gel.

20 Claims, 9 Drawing Sheets

OTHER PUBLICATIONS

M. Rousek, "Results of the Development of Biodegradable Oils Suitable for Forest Machines," Res. Agr. Eng., 2003, pp. 12-21, vol. 49, No. 1. Available from: http://www.cazv.cz/2003/RAE1_03/ZT%2001_3%20Rousek.pdf May 24, 2006.

"Oils, Fats & Waxes," Pharmcentral, 2000. Available from: http://dwb.unl.edu/Teacher/NSF/C10/C10Links/www.pharmcentral.com/oils.htm.

Akzo Nobel Oleochemicals, "Nouracid LE 80," Sep. 9, 2004. Available from: http://www.akzonobel-oleochemicals.com/productsheet.asp?productcode=58309&Product.

Akzo Nobel Oleochemicals, "Nouracid SE 30," Sep. 9, 2004. Available from: http://www.akzonobel-oleochemicals.com/productsheet.asp?productcode=58412&Product.

Bioriginal, "Standard Specification: Oils-Fish 1812TG," Jul. 8, 2005.

Bioriginal, "Final Specification: Flax Oils—190kg Drum," Jul. 26, 2005.

"Mechanisms of Lipid Oxidative Fragmentation," Robert G. Salomon Lipid Research Laboratory, cited Feb. 28, 2006. Available from: http://www.case.edu/artsci/chem/faculty/salomon/Mechanisms.htm.

"Vitamin C Derivatives as Antioxidant Agents," cited Mar. 9, 2006. Available from: http://www.netsci-journal.com/97v4/97014/vitc5.html.

G. Costa, "Olive Oil Fatty Acid Profiles and Other Components," OliveBusiness.com, cited Mar. 9, 2006. Available from: http://olivebusiness.com/OBGuest/Oth/olive_oil_fatty_acid_profiles_an.htm.

"Fatty Acids," cited Mar. 9, 2006. Available from: http://www.cyberlipid.org/fa/acid0001.htm.

"Monoenoic Fatty Acids," cited Mar. 9, 2006. Available from: http://www.cyberlipid.org/fa/acid0002.htm.

"Polyenoic Fatty Acids," cited Mar. 9, 2006. Available from: http://www.cyberlipid.org/fa/acid0003.htm.

"Halogenated Fatty Acids," cited Mar. 9, 2006. Available from: http://www.cyberlipid.org/fa/acid0007.htm.

"Introduction to Lipid Peroxidation," cited Mar. 9, 2006. Available from: http://www.cyberlipid.org/perox/oxid0002.htm.

"Mechanisms of Fatty Acid Oxidation," cited Mar. 9, 2006. Available from: http://www.cyberlipid.org/perox/oxid0006.htm.

"Primary Products of Fatty Acid Oxidation," cited Mar. 9, 2006. Available from: http://www.cyberlipid.org/perox/oxid0007.htm.

"Secondary Peroxidation Products from Fatty Acids or More Complex Lipids," cited Mar. 9, 2006. Available from: http://www.cyberlipid.org/perox/oxid0009.htm.

"Amino Compound-Containing Lipids," cited Mar. 9, 2006. Available from: http://www.cyberlipid.org/simple/simp0005.htm.

"Triacylglycerols," cited Mar. 9, 2006. Available from: http://www.cyberlipid.org/glycer/glyc0004.htm.

"Plant Oils and Fats," cited Mar. 9, 2006. Available from: http://www.cyberlipid.org/glycer/glyc0005.htm.

"Autoxidation and Antioxidation," cited Mar. 9, 2006. Available from: http://www.cqb.fc.ul.pt/menergetics/autoxidation_and_antioxidation.htm.

"Lipid Oxidation," cited Mar. 9, 2006. Available from: http://www.landfood.ubc.ca/courses/fnh/410/lipids/5_8.htm.

The Fish Foundation, "Fish Oils," cited Mar. 9, 2006. Available from: http://www.fish-foundation.org.uk/fishoils.htm.

Bioriginal, "About Bioriginal," cited Mar. 9, 2006, copyright 2004. Available from: http://www.bioriginal.com/about_bioriginal.htm.

Bioriginal, "Standard EFA Oils," cited Mar. 9, 2006, copyright 2004. Available from: http://www.bioriginal.com/bulk_oils_27.htm.

"Fatty Acids," cited Mar. 9, 2006. Available from: http://www.genome.ad.jp/kegg/catalog/cpd_fatty.html.

Apag; European Oleochemicals and Allied Products Group, "Properties and Composition of Vegetable and Special Oils," cited Mar. 10, 2006. Available from: http://www.apag.org/oleo/fatsoil.pdf.

"Polyunsaturated Fatty Acids (PUFAs)," Mar. 22, 2006, cited May 24, 2006. Available from: http://lansbury.bwh.harvard.edu/polyunsaturated_fatty_acids.htm.

Akzo Nobel, "Technical Oils: Surface Chemistry," available May 24, 2006. Available from: http://www.akzonobel-oleochemicals.com/PDF%20Files/Technical%20Oils.pdf.

D. H. Morris, "Flax—A Health and Nutrition Primer: Chapter 1 Description and Composition of Flax," cited May 24, 2006. Available from: http://www.flaxcouncil.ca/FlaxPrimer_Chptr1.pdf.

* cited by examiner

Effect of High Monoenoic Acid Oil On VES Viscosity 10.8 ppg CaCl2 Based VES Fluid With Fish Oil 18:12TG at 200 F (93 C)

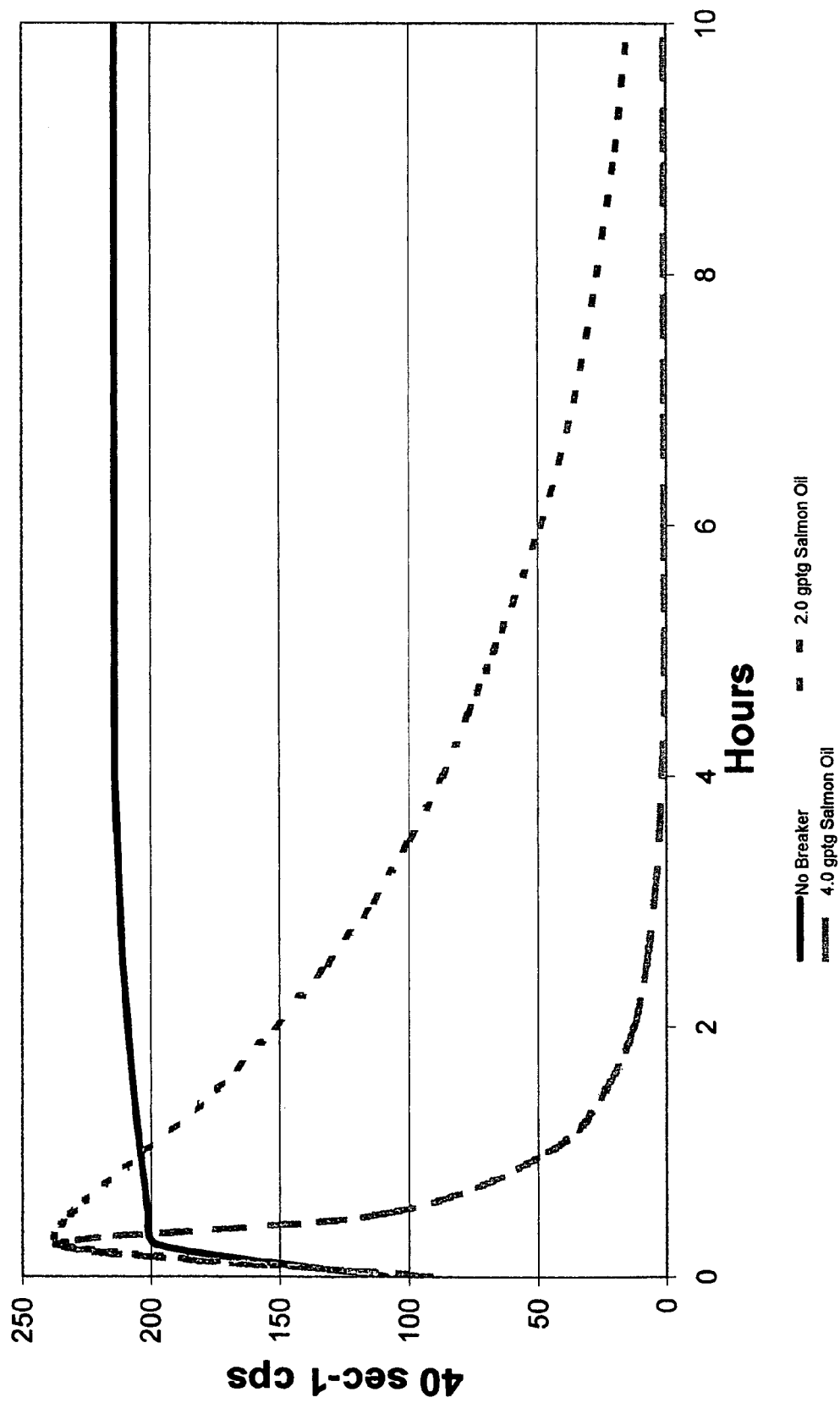

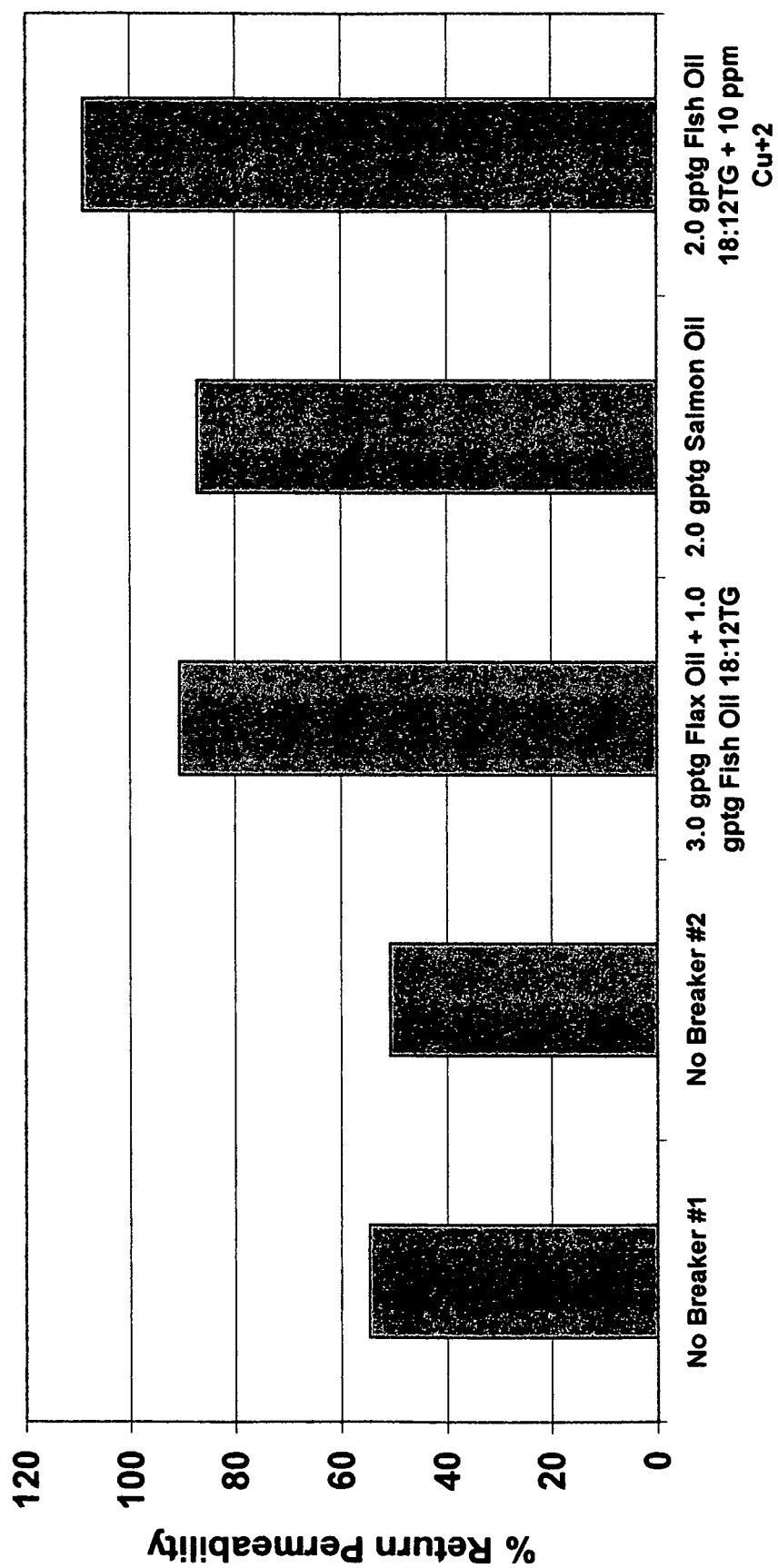

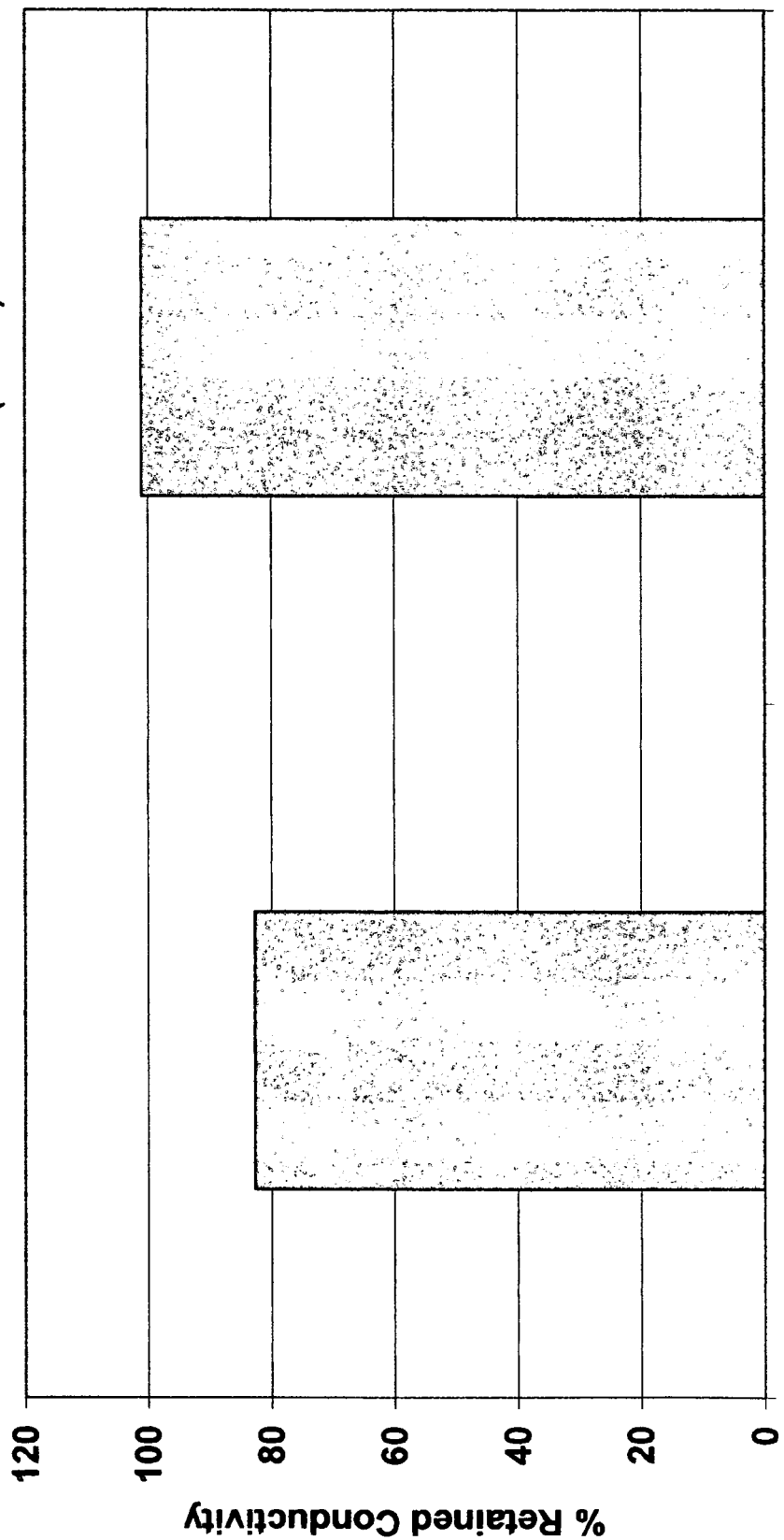

COMPOSITIONS AND USE OF MONO- AND POLYENOIC ACIDS FOR BREAKING VES-GELLED FLUIDS

CROSS-REFERENCE TO RELATED APPLICATION

This application claims the benefit of U.S. provisional application No. 60/662,336 filed Mar. 16, 2005.

TECHNICAL FIELD

The present invention relates to gelled treatment fluids used during hydrocarbon recovery operations, and more particularly relates, in one embodiment, to methods of "breaking" or reducing the viscosity of aqueous treatment fluids containing viscoelastic surfactant gelling agents used during hydrocarbon recovery operations.

BACKGROUND

One of the primary applications for viscosified fluids is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous-based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular polymers. The VES materials may leave less gel residue within the pores of oil producing formations, leave no filter cake (dehydrated polymer) on the formation face, leave a minimal amount of residual surfactant coating the proppant, and inherently do not create microgels or "fish-eyes"-type polymeric masses.

However, very little progress has been made toward developing internal breaker systems for the non-polymeric VES-based gelled fluids. To this point, VES gelled fluids have relied on "external" or "reservoir" conditions for viscosity reduction (breaking) and VES fluid removal (clean-up) during hydrocarbon production. Additionally, over the past decade it has been found that reservoir brine dilution has only a minor if any breaking effect of VES gel within the reservoir. Instead, only one reservoir condition is primarily relied on for VES fluid viscosity reduction (gel breaking or thinning), and that has been the rearranging, disturbing, and/or disbanding of the VES worm-like micelle structure by contacting the hydrocarbons within the reservoir, more specifically contacting and mixing with crude oil and condensate hydrocarbons.

However, in many gas wells and in cases of excessive displacement of crude oil hydrocarbons from the reservoir pores during a VES gel treatment, results have showed many instances where VES fluid in portions of the reservoir are not broken or are incompletely broken resulting in residual formation damage (hydrocarbon production impairment). In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and only sections of the reservoir interval are normally cleaned up, leaving the remaining sections with unbroken or poorly broken VES gelled fluid that impairs hydrocarbon production. Because of this phenomenon and other occasions where reliance on external factors or mechanisms has failed to clean-up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Internal breakers include breaker systems that use products that are incorporated within the VES-gelled fluid that are activated by downhole temperature that will allow a controlled rate of gel viscosity reduction over a rather short period of time, similar to gel break times common for conventional crosslinked polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures. Conventional enzymes and oxidizers have not been found to act and degrade the surfactant molecules or the viscous micelle structures they form. It is still desirable, however, to provide some mechanism that relies on and uses internal phase breaker products that will help assure complete viscosity break of VES-gelled fluids.

It would be desirable if a viscosity breaking system could be devised to break the viscosity of fracturing and other well completion fluids gelled with and composed of viscoelastic surfactants, particularly break the viscosity very easily, completely, and relatively quickly without the necessity of contacting or relying on reservoir hydrocarbons.

SUMMARY

There is provided, in one form, a method for breaking viscosity of aqueous fluids gelled with a viscoelastic surfactant (VES) that involves adding to an aqueous fluid gelled with at least one viscoelastic surfactant at least one unsaturated fatty acid (UFA). Subsequently, the fluid is subjected to a temperature effective to cause the unsaturated fatty acid to auto-oxidize into products present in an amount effective to reduce the viscosity of the gelled aqueous fluid.

In another embodiment, there is provided an aqueous fluid that includes water; at least one viscoelastic surfactant (VES) in an amount effective to increase the viscosity of the aqueous fluid; and at least one unsaturated fatty acid (UFA) that auto-oxidizes and forms products present in an amount effective to reduce the viscosity of the gelled aqueous fluid when the fluid is subjected to an effective temperature.

BRIEF DESCRIPTION OF THE DRAWINGS

FIG. 7 is a graph showing the results of using a second type of nutritional fish oil within a WG-3L VES-gelled fluid at 150° F. (66° C.);

FIG. 8 is a graph showing the amount returned to original permeability of Ohio Berea cores injected with WG-3L VES-gelled fluid with and without internal breaker at 150° F. (66° C.); and FIG. 9 is a graph showing the amount of retained proppant pack conductivity with WG-3L VES-gelled fluid with and without internal breaker at 250° F. (121° C.).

DETAILED DESCRIPTION

Figure 1:
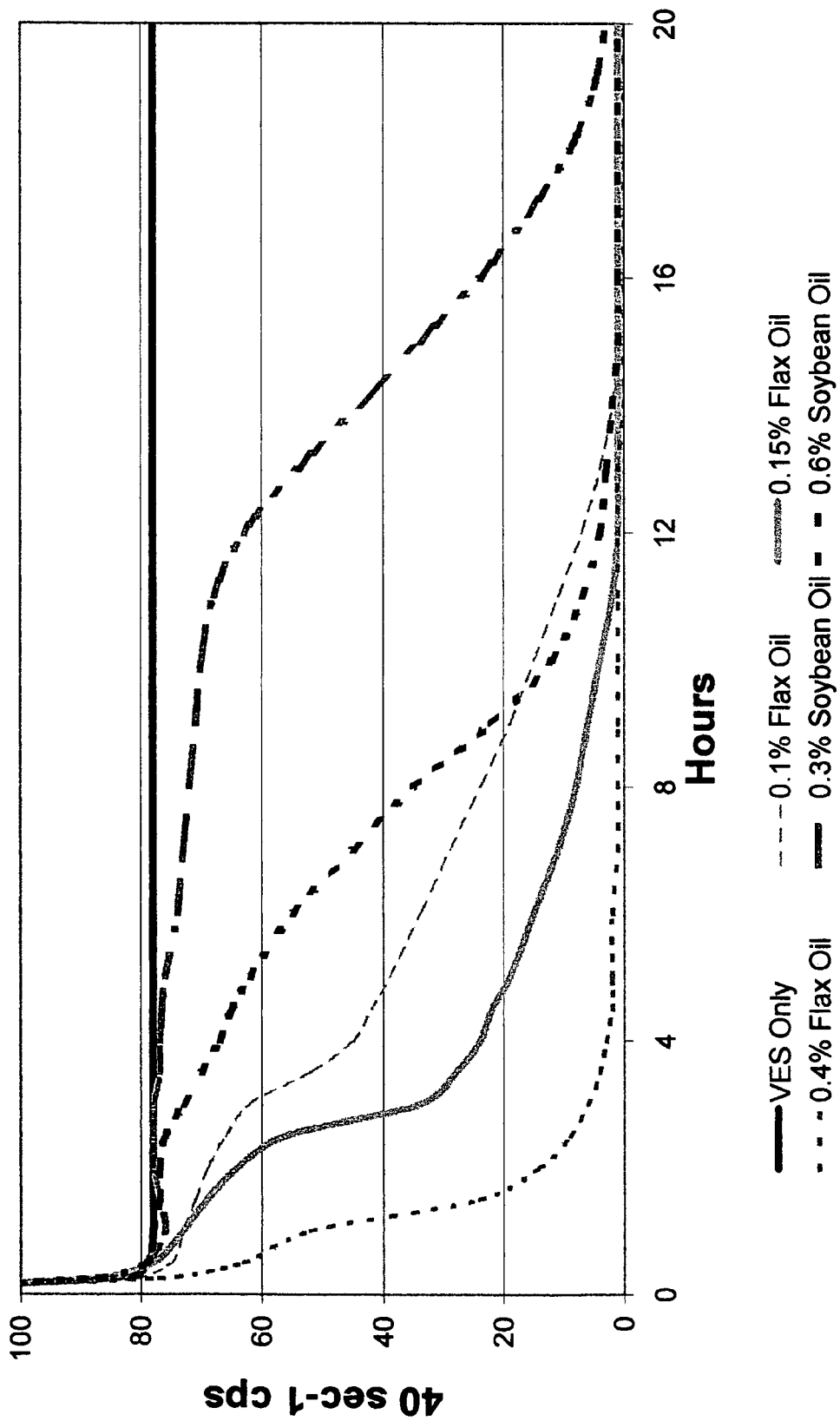
FIG. 1 is a graph showing the results using two different plant seed oils high in polyenoic acids at various concentrations within a WG-3L VES-gelled fluid at 180° F. (82° C.)
Figure 2:
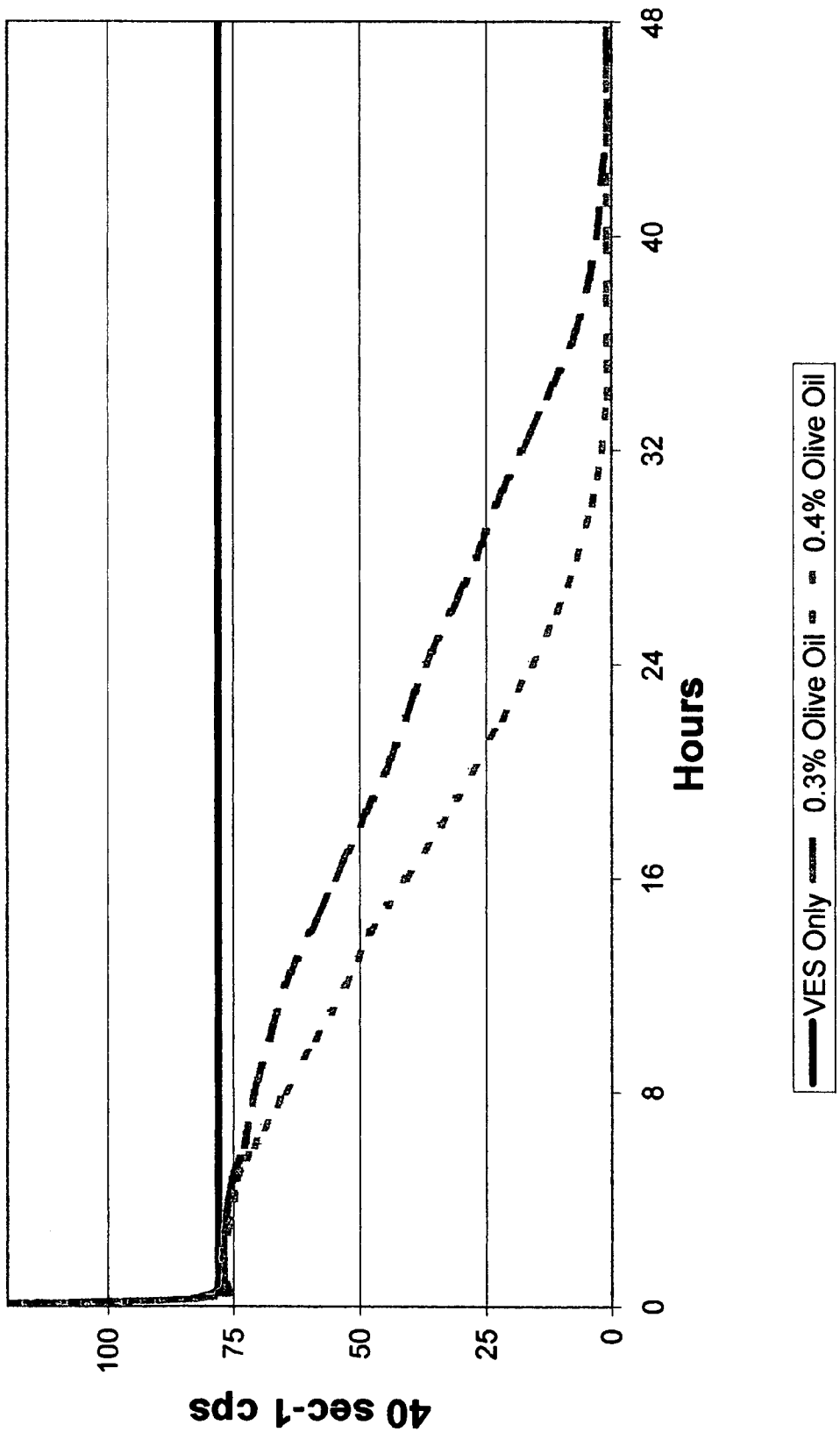
FIG. 2 is a graph of showing the results using "extra virgin"-type olive oil high in monoenoic acids at two different concentrations within a WG-3L VES-gelled fluid at 180° F. (82° C.)

As noted, aqueous fluids gelled with viscoelastic surfactants are typically used in wellbore completions, such as hydraulic fracturing, without the use of an internal phase breaker system, and generally rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has shown instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). More recently there have been the development of "internal breakers" for VES fluids (that is, viscosity breakers that are incorporated within the VES fluid and that travel wherever the fluid goes), such as the use of bacteria, salts, alcohols, acids, polymers, and catalytic metal redox systems. These methods have one or more limitations and thereby are not as effective as they could be or they lack versatility to be used over a wide range of common treatment conditions (such as fluid temperature, fluid pH, fluid salinity (i.e. seawaters and high density completion brines), and the like). There needs to be a more versatile and robust method for breaking VES-gelled fluids that can be as easy, as quick, and as economical as breaking conventional crosslinked polymer fluids.

A new method has been discovered to reduce the viscosity of aqueous fluids gelled with viscoelastic surfactants (i.e. surfactants that develop viscosity in aqueous brines by formation of rod- or worm-shaped micelle structures). The improvement will allow VES-gelled fluids to have their viscosity broken and become an easily producible fluid by a novel and robust chemical mechanism that appears to simply alter the micelle structure into a non-viscous form; that is the apparent rearrangement from a viscous rod- or worm-like micelle structure to a collapsed or more spherical non-viscous type micelle structure that results in a watery viscosity, clean appearing, easily producible, broken VES fluid.

The breaker components herein can be added safely and easily to the gel during batch mixing of a VES-gel treatment, or added on-the-fly during continuous mixing of a VES-gel treatment using a liquid additive metering system in one non-limiting embodiment, or the components can be used separately, if needed, as an external breaker solution to remove VES gelled fluids already placed downhole. The mono- and/or polyenoic acid oils are not solubilized in the brine, but rather interact with the VES surfactant to be dispersed and form an emulsion (oil in water type emulsion) and thus there is an oil-stabilized emulsion dispersed in the "internal phase" as a "discontinuous phase" of the brine medium/VES fluid which is the "outer phase" or "continuous phase".

It appears in most cases the UFAs are evenly dispersed and are incorporated within the viscous rod- or worm-like shape micelles. Rheometer tests have showed, as presented in FIG. 1 through 7, that the incorporation of the UFAs into (within or a part of) the VES micelles does not disturb the viscosity yield of the VES micelles at the levels or amounts of UFAs needed to obtain a complete VES gel viscosity break. However, in some cases it may be desirable or it is allowable to add one or more emulsifying agents to further enhance the dispersion and/or stability of the UFA oils within the VES fluid, such as an emulsifying surfactant, POE (20) sorbitan monolaurate known as Tween 20, lecithin, and the like.

Surprisingly and unexpectedly the method employs unsaturated fatty acids, such as monoenoic acids and polyenoic acids as breakers, in one non-limiting embodiment specific oils that contain a relatively high amount of either monoenoic or polyenoic acids or both. There are many books and other literature sources that list the multiple types and amounts of fatty acids compositions of oils and fats available from plant, fish, animal, and the like. A polyenoic acid is defined herein as any of various fatty acids having more than one double bond (allyl group) in the carbon chain, e.g. in linoleic acid. Correspondingly, a monoenoic acid is a fatty acid having only one double bond (allyl group). The terms unsaturated fatty acid (UFA) or unsaturated fatty acids (UFAs) are defined herein as oils or fats containing one or the other or both monoenoic and polyenoic fatty acids. Other suitable polyenoic acids include, but are not necessarily limited to omega-3 fatty acids, and omega-6 fatty acids, stearidonic acid, eleostearic acid, eicosadienoic acid, eicosatrienoic acid, arachidonic acid or eicosatetraenoic acid (ETA), eicosapentaenoic acid (EPA), docosapentaenoic acid, docosahexaenoic acid, cis-linoleic acid, cis-linolenic acid, gamma-linolenic acid, conjugated polyenes, and mixtures thereof. Other suitable monoenoic acids include, but not necessarily limited to obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

Oils relatively high in monoenoic and polyenoic acids include, but are not necessarily limited to flax (linseed) oil, soybean oil, olive oil, canola (rapeseed) oil, chia seed oil, corn oil, cottonseed oil, evening primrose oil, grape seed oil, pumpkin seed oil, safflower oil, sunflower oil, walnut oil, peanut oil, various fish oils, mammal oils, and animal oils or fats and the like.

Any of these oils or fats may be partially hydrogenated, or may contain original or additional preservatives, such as tocopherols, and the like. Additionally any one or more of these oils can be "aged" before use to adjust the product's auto-oxidation activity, along with any one or more reagent or technical grade fatty acids. Allowing a specific fatty acid or UFA oil to "age" allows auto-oxidation to initiate and progress dependant on the amount of time, environmental conditions (temperature, exposure to atmosphere, etc.), presence of other compounds (tocopherols, metal ions, etc), and the like.

It appears that the more double-bonded carbons on the fatty acid carbon chain the more active that fatty acid will be in auto-oxidation, that is, these materials auto-oxidize easier and more quickly. This seems to be a general rule, although other components in the oil may alter this rule. Table 1 lists the relative rates of oxidation of common fatty acids, from the "Autoxidation" section within "Chemical Reactions of Oil, Fat, and Based Products", Department of Engineering, Instituto Superior T'echnico, Lisbon, Portugal, October 1997.

TABLE 1

Relative Oxidation Rates of Some Common Fatty Acids

| Fatty acid | Total amount of carbon atoms | Number of double carbon bonds | Relative rate of oxidation |
|---|---|---|---|
| Stearic | 18 | 0 | 1 |
| Oleic | 18 | 1 | 100 |
| Linoleic | 18 | 2 | 1200 |
| Linolenic | 18 | 3 | 2500 |

Unsaturated fatty acids have been found to break down by "auto-oxidation" into a gamut of VES-breaking products or compositions. Each oil with various monoenoic and polyenoic acids uniquely shows the breakdown of the VES surfactant micelle structure by the presence of these auto-oxidation generated byproducts. Auto-oxidation is also known as autoxidation and lipid peroxidation which includes the oxidation of unsaturated fatty acids. Auto-oxidation in this context also includes a chain reaction—multiple steps and chemical species occur in the oxidative breakdown. Various hydroperoxides can be formed in these auto-oxidations, and end products typically include, but are not necessarily limited to, carbonyl compounds (various aldehydes and ketones), alcohols, acids, and "hydrocarbons" of various types, e.g. alkanes, saturated fatty acids and the like, and mixtures thereof. A variety of technical books and papers list many of the numerous products generated by auto-oxidation (autoxidation) of unsaturated fatty acids.

Fatty acids may also decompose in a water medium and alkaline condition by hydrolysis.

It may be possible that other olefins (e.g. allyl group compounds) may be investigated and employed in the same manner that unsaturated fatty acids have been found to work toward breaking VES gelled fluids. It also may be possible that mechanisms other than oxidation or hydrolysis may be functioning in generating VES breaking compounds from olefins and olefin derivatives, although the inventor does not want the methods and compositions herein to be limited by any supposed theory.

In one non-limiting embodiment these gel-breaking products work by rearrangement of the VES micelle from rod-shaped or worm-shaped elongated structures to spherical structures: that is, the collapse or rearrangement of the viscous elongated micelle structures to non-viscous more spherical micelle structures. Disaggregating may be understood in one non-limiting embodiment when the micelles are not closely associated physically, that is no longer aggregated or physically interacted together resulting in reduced fluid viscosity, as contrasted with rearrangement which may be understood as a different physical and chemical arrangement or aggregation of the multi-surfactant micelle that has reduced viscosity. However, the inventor does not necessarily want to be limited to any particular mechanism or explanation.

The auto-oxidation is believed to be triggered or initiated or enhanced by heat. These mono- and polyenoic acids will slowly to fairly rapidly, upon heating or subjecting the acids to a temperature, auto-oxidize into the VES gel breaking compounds with the addition of or in the absence of any other agent. The amount of altered or oxidized unsaturated fatty acid needed to break a VES-gelled fluid appears to be VES concentration and temperature dependent, with typically more needed as the VES concentration increases and less needed as fluid temperature increases. Once a fluid is completely broken at an elevated temperature a degree of viscosity reheal may occur but in most cases no reheal in viscosity will occur and no phase separation of the VES occurs upon fluid cool down, that is when the test fluid is left at test temperature for a sufficient amount of time for complete to near-complete auto-oxidation of the monoenoic and/or polyenoic acids to occur.

Controlled viscosity reduction rates can be achieved in one non-limiting embodiment by subjecting the UFA to a temperature of from about 70° F. to about 300° F. (about 21 to about 149° C.), and alternatively at a temperature of from a lower limit of about 80° F. (27° C.) or a lower limit of 100° F. (38° C.) and/or up to an upper limit of about 280° F. (about 138° C.). In another non-limiting embodiment, the fluid designer would craft the fluid system in such a way that the VES gel would break at or near the formation temperature after fracturing was accomplished.

Fluid design would be based primarily on formation temperature, i.e. the temperature the fluid will be heated to naturally in the formation once the treatment is over. Fluid design may be based on the expected cool down of the fluid during a treatment. In many cases the fracturing fluid may only experience actual reservoir temperature for 5% to 25% of the job time, and close to 50% of the fluid is never exposed to the original reservoir temperature because of the cool down of the reservoir by the initial fracturing fluid placed into the reservoir. It is because a portion of the fracturing fluid will not see the original reservoir temperature that a cooler temperature is selected that will represent what the fluid will probably see or experience, and thus laboratory break tests, such as those discussed below, are run at this cooler temperature. There would generally be no additional temperature the VES fluid would see other than original reservoir temperature.

The use of the disclosed breaker system is ideal for controlling viscosity reduction and improving the clean-up of VES based fracturing fluids. The breaking system may also be used for breaking and improving the clean-up of gravel pack fluids, acidizing or near-wellbore clean-up diverter fluids, and loss circulation pill fluids composed of VES. The breaker system may additionally work for foamed fluid applications (hydraulic fracturing, acidizing, and the like), where $N_2$ or $CO_2$ gas is used for the gas phase. This VES breaking method is a significant improvement, in one non-limiting example, in that it gives breaking rates for VES based fluids that the industry is accustomed to with conventional polymer based fracturing fluids, such as borate crosslinked guar. Potentially more importantly, in another non-limiting example, the use of this internal breaker system in combination with external downhole breaking conditions should help assure and improve hydrocarbon production compared to prior art that uses only external mechanisms to break the VES fluid for effective and complete VES fluid clean-up after a treatment.

In one non-limiting embodiment, the compositions herein through auto-oxidation into by-products will directly degrade or digest the gel created by a VES in an aqueous fluid, and alternatively will reduce the viscosity of the gelled aqueous fluid either directly, or by disaggregation or rearrangement of the VES micellar structure (e.g. collapsing or disturbing the structure). However, the inventor does necessarily not want to be limited to any particular mechanism or theory.

In another non-limiting embodiment, the composition may be modified to slow down or to increase the auto-oxidation of the unsaturated fatty acids. Addition of compounds that influence the rate of auto-oxidation is an important option for the methods and fluids herein, in particular for the lower temperatures to increase the auto-oxidation rate and at higher temperatures to slow down the auto-oxidation rate. Rate control compounds that may be used for slowing down rate of monoenoic and polyenoic acids may be antioxidants such as, but not limited to tocopherol (vitamin E), ascorbic acid (vitamin C), butylated hydroxytoluene (BHT) and other like preservatives, chelants (such as citric acid, phosphates, and EDTA), amino acids, proteins, sugar alcohols (e.g. mannitol, xylitol, lactitol, and sorbitol), salts (such as NaCl, $MgCl_2$, $CaCl_2$, NaBr and $CaBr_2$), and the like. Rate control compounds that may increase the rate of auto-oxidation may be oxidants or pro-oxidants such as, but not limited to persulfate, percarbonate, perbromate, iron, copper, manganese and other transition metals, and the like. It should be noted that there are numerous compounds that may be of utility for regulating the rate of auto-oxidation. The proportion of rate control compounds that may be advantageously used may range from a lower limit of about 0.00001% by weight to an upper limit of about 62% by weight, based on the total weight of fluid, and alternatively from a lower limit of 0.0001% by weight and/or to an upper limit of about 45% by weight. It can be noted that rate controllers used toward the lower limit may be items such as metal ions and rate controllers employed toward the upper limit may be items such as monovalent and/or divalent salts. As will be shown, chelation of the metal ions tends to slow the rate of auto-oxidation as compared with non-chelated forms of the same metal ions. In one non-limiting understanding, the use of metal ions (whether or not chelated) may be understood as "catalyzing" the auto-oxidation of the UFA.

It is difficult, if not impossible, to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the concentration of VES used; the particular plant, fish or animal oil used; the special or particular blend of fatty acid oils; the particular unsaturated fatty acid used; the particular oil used to carry the unsaturated fatty acid; the type and amount of rate controlling agent or agents; the temperature of the fluid; the downhole pressure of the fluid, the starting pH of the fluid; and the complex interaction of these various factors. Nevertheless, in order to give a general feel for the proportions of the various breaking components to be used in the methods and fluids herein, approximate ranges will be provided. The amount of unsaturated fatty acid that may be effective in the methods and compositions may range from about 500 to about 25,000 ppm, based on the total amount of the fluid. In another non-restrictive version, the amount of unsaturated fatty acid may range from a lower limit of about 1000 and/or to an upper limit of about 15,000 ppm.

Any suitable mixing apparatus may be used for this procedure. In the case of batch mixing, the VES and the aqueous fluid are blended for a period of time sufficient to form a gelled or viscosified solution. The oil containing the mono- and/or polyenoic acid or the neat unsaturated fatty acid may be added at the time the fluid is formulated or later. The VES that is useful in the present methods and compositions can be any of the VES systems that are familiar to those in the well service industry, and may include, but are not limited to, amines, amine salts, quaternary ammonium salts, amidoamine oxides, amine oxides, mixtures thereof and the like.

Viscoelastic surfactants improve the fracturing (frac) fluid performance through the use of a polymer-free system. These systems, compared to polymeric based fluids, can offer improved viscosity breaking, higher sand transport capability, are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quatemary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox APA-T formulation, which should be understood as a dipropylamine oxide since both R' groups are propyl.

Suitable amine oxide gelling materials include, but are not limited to, ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50-65% APA-T and from about 25-40% propylene glycol. These viscoelastic surfactants are capable of gelling aqueous solutions to form a gelled base fluid. The additives of these methods and compositions are used to prepare a VES system sold by Baker Oil Tools as DiamondFRAQ™. Diamond FRAQ™ with its assured breaking technology overcomes reliance on external reservoir conditions in order to break, as compared with products such as ClearFRAC™.

The methods and compositions herein also cover commonly known materials as Aromox APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gallons per thousand gallons (gptg)). In another non-limiting embodiment, the range for the present compositions and methods is from about 1.0 to about 6.0% by volume VES product. In an alternate, non-restrictive form, the amount of VES ranges from 2 to about 10 volume %.

It is expected that the breaking compositions herein can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids), gravel pack fluids, viscosifiers used as diverters in acidizing (including foam diverters), VES viscosifiers used to dean up drilling mud filter cake, remedial cdean-up of fluids after a VES treatment (post-VES treatment) in regular or foamed fluid forms (i.e. the fluids may be "energized") with or the gas phase of foam being $N_2$ or $CO_2$, and the like.

A value of the methods and compositions herein is that a fracturing or other fluid can be designed to have enhanced breaking characteristics. That is, fluid breaking is no longer dependant on external reservoir conditions for viscosity break: the rate of viscosity reduction, if complete break is achieved/occurs throughout the reservoir interval, and the like. Importantly, better clean-up of the VES fluid from the fracture, proppant, and wellbore can be achieved thereby. Better clean-up of the VES directly influences the success of the fracture treatment, which is an enhancement of the well's hydrocarbon productivity. VES fluid clean-up limitations and failures of the past can now be overcome or improved by the use of DiamondFRAQ™ improved VES gel clean-up technology.

In order to practice the methods and compositions herein, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. Alternatively, the breaking composition may be added separately.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m³) of fracturing fluid composition, but higher or lower concentrations can be used as the fracture design required. The base fluid can also contain other conventional additives common to the well service industry such as water wetting surfactants, non-emulsifiers and the like. As noted for these compositions and methods, the base fluid can also contain other non-conventional additives which can contribute to the breaking action of the VES fluid, and which are added for that purpose.

Any or all of the above unsaturated fatty acids may be provided in an extended release form such as encapsulation by polymer or otherwise, pelletization with binder compounds, absorbed or some other method of layering on a microscopic particle or porous substrate, and/or a combination thereof. Specifically, the mono- and/or polyenoic acids may be micro and/or macro encapsulated to permit slow or timed release thereof. In non-limiting examples, the coating material may slowly dissolve or be removed by any conventional mechanism, or the coating could have very small holes or perforations therein for the unsaturated fatty acids within to diffuse through slowly. For instance, a mixture of fish gelatin and gum acacia encapsulation coating available from ISP Hallcrest can be used to encapsulate plant, fish and other oils. Also, polymer encapsulation coatings such as used in fertilizer technology available from Scotts Company, specifically POLY-S® product coating technology, or polymer encapsulation coating technology from Fritz Industries could possibly be adapted to the methods or compositions herein. The unsaturated fatty acids could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mono- and/or polyenoic acids may be both absorbed into and onto porous or other substrates and then encapsulated or coated, as described above.

In a typical fracturing operation, the fracturing fluid is pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any SI volume unit, e.g. 60.0 liters/1000 liters) amine oxide VES, such as SurFRAQ, in a 2 to 7% (w/v) (166 lb to 581 lb/1000 gal, 19.9 kg to 70.0 kg/m$^3$) KCl solution at a pH ranging from about 6.0 to about 9.0. The breaking components are typically added before or during the VES addition using appropriate mixing and metering equipment, or if needed in a separate step after the fracturing operation is complete or on the fly when going downhole. One unique aspect of this novel breaking chemistry is how the plant, fish and like type oils may be added and dispersed within the brine mix water prior to the addition of VES, such as the suction side of common hydration units or blender tubs pumps. These oils, used at the typical concentrations needed to achieve quick and complete break, do not initially act as detrimental oils and degrade VES yield and the like. However, most other oils have a detrimental effect to VES yield if already present or when added afterwards. One novelty of the enoic-type oils described herein is they are VES-friendly initially but over time and a given temperature become aggressive VES gel breakers. By "VES-friendly" is meant they are compatible therewith and do not immediate decrease viscosity of aqueous fluids gelled with VES as is seen with most other oils.

In one embodiment, the method herein is practiced in the absence of gel-forming polymers and/or gels or aqueous fluids having their viscosities enhanced by polymers. However, combination use with polymers and polymer breakers may also be of utility. For instance, polymers may also be added to the VES fluids herein for fluid loss control purposes. Types of polymers that may serve as fluid loss control agents are various starches, polyvinyl acetates, polylactic acid, guar and other polysaccharides, gelatins, and the like.

The present invention will be explained in further detail in the following non-limiting Examples that are only designed to additionally illustrate the methods and compositions but not narrow the scope thereof.

General Procedure for Examples 1 through 9

To a blender were added tap water, 3 wt % KCl, followed by 4 vol % viscoelastic surfactant (WG-3L—Aromox® APA-T from Akzo Nobel). The blender was used to mix the components on a very slow speed, to prevent foaming, for about 30 minutes to viscosify the VES fluid. Mixed samples were then placed into plastic bottles. Various components singly or together, in various concentrations, were then added to each sample, and the sample was shaken vigorously for 60 seconds. The samples were placed in a water bath at the indicated temperature and visually observed every 30 minutes for viscosity reduction difference between the samples. Since a goal of the research was to find a relatively rapid gel breaking composition, samples were only observed for 24 to 48 hours.

Viscosity reduction can be visually detected. Shaking the samples and comparing the elasticity of gel and rate of air bubbles rising out of the fluid can be used to estimate the amount of viscosity reduction observed. Measurements using a Brookfield PVS rheometer at 180° F. (82° C.) with 300 psi pressure and 40 sec$^{-1}$ were used to acquire quantitative viscosity reduction of each sample.

EXAMPLE 1

Shown in FIG. 1 are the results of using two different plant seed oils high in polyenoic acids at different concentrations within WG-3L viscoelastic surfactant gelled fluid at 180° F. (82° C.). Surprisingly and unexpectedly complete VES viscosity reduction was observed with addition of a small amount of these oils over a 16 hour period using 0.1% bv (1.0 gptg) flax oil. Complete viscosity reduction over a 12 hour period was achieved using 0.15% bv (1.5 gptg). In another case, complete viscosity reduction was achieved over a 20 hour period by the addition of 0.3% bv (3.0 gptg) soybean oil.

The oils tested were Rexall brand flax oil and Crisco brand soybean bean oil. Both products have high diene and triene fatty acid content, with flax oil having a significantly higher amount of triene fatty acids. It appears the 18:3 triene acids are more active in auto-oxidation than 18:1 monoenes and 18:2 dienes at conditions tested, resulting in altered polyene compounds (such as various hydroperoxides, aldehydes, and ketones) that appear to degrade the VES micelle structural arrangement and associated fluid viscosity at the concentrations generated. The results show an easy, efficient, and highly cost effective method for breaking VES gel viscosity. (The "18:3" notation indicates that there are 3 double bonds in 18 carbon atoms.)

Flax oil has more 18:3 fatty acids that soybean oil (triene; also called trienoic, polyenoic, polyunsaturated, and linolenic fatty acid), and this may explain why in FIG. 1 the flax oil breaks the fluid more quickly initially than soybean oil. Once the 18:3 (n–3) polyenoic acid is auto-oxidized, it is the remaining 18:1 acids (monoene; also called monounsaturated, monoenoic, or oleic fatty acid) and 18:2 acids (diene; also called dienoic, polyenoic, polyunsaturated, or linoleic fatty acid) that then play a factor in the rate of additional breaking of the gel.

Soybean oil has more 18:3 and 18:2 fatty acids than Extra Virgin olive oil (used in Example 2), and this may explain why a faster complete break is seen with use of soybean oil.

Olive oil is relatively high in 18:1 fatty acids. Unsaturated fatty acids can have more than one structure to the chain, such as cis and trans, as well as other structures, so the type of activity one 18:3 fatty acid has compared to another 18:3 fatty acid can be different, and the same applies for the 18:2 and 18:1 fatty acids.

There are polyenoic acids that have more than 3 double carbon bonds, such as 18:4 (stearidonic acid), 20:4 (arachidonic acid), 20:5 (eicosapentaenoic acid (EPA)), 22:6 (docosahexaenoic acid (DHA)), and others. These fatty acids having more than three double bonds per molecule may play an important role in rate of auto-oxidation at lower temperatures (such as below 160° F. (71° C.)) and at higher temperatures in high density brine mix waters (such as 160° F. to 280° F. (71° C. to 138° C.) in 9.0 ppg KCl, 10.0 ppg $CaCl_2$, 13.0 ppg NaBr, 13.0 ppg $CaBr_2$, 14.4 ppg $CaCl_2/CaBr_2$ and the like).

EXAMPLE 2

Results showing the effect of using Extra Virgin-type olive oil within WG-3L gelled fluid at 180° F. (82° C.) are presented in FIG. 2. Complete VES viscosity reduction was observed with addition of a small amount of this oil. The product tested was Bertolli Extra Virgin brand and type of olive oil. The data shows that at the olive oil concentrations tested, the VES fluid had good initial viscosity (no noticeable effect on VES fluid viscosity over approximately the first 2 hours at 180° F. (82° C.)). Auto-oxidation of the oil showed breaking products were generated after about 2 to 4 hours. Olive oil is characteristically much higher in monoenes than dienes and trienes. This may account for why the olive oil tests broke more slowly (rate of viscosity reduction over time) than the flax and soybean break tests, as seen in Example 1 and FIG. 1. This test appears to show that monounsaturated fatty acids may be of utility for this discovery.

EXAMPLE 3

Figure 3:
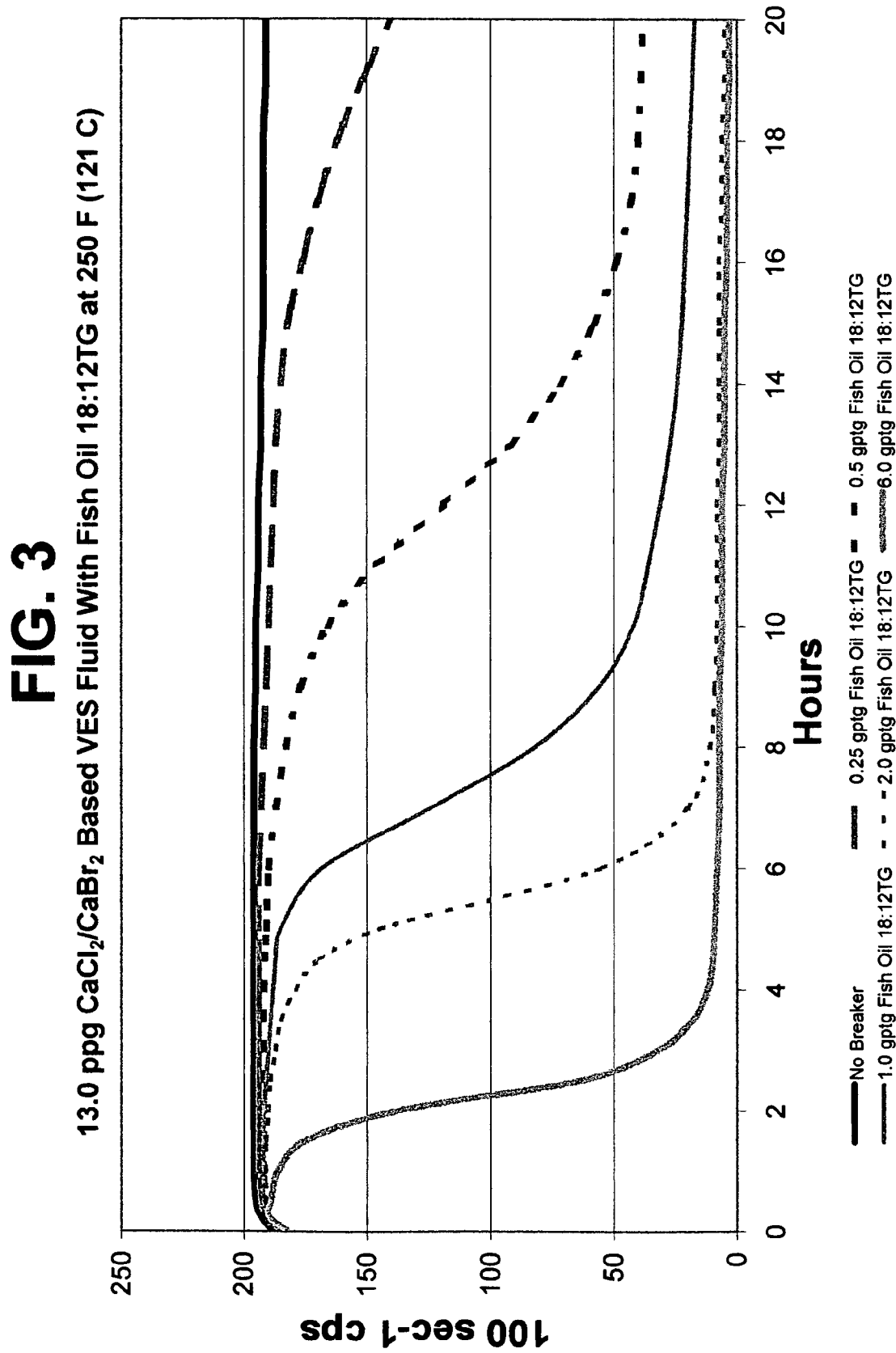
FIG. 3 is a graph showing the results of using nutritional fish oil within a WG-3L VES-gelled fluid mixed within 13.0 ppg $CaCl_2/CaBr_2$ brine mix water at 250° F. (121° C.)

Results showing the effect of using a fish oil within 13.0 ppg (pounds per gallon) $CaCl_2/CaBr_2$ brine based WG-3L gelled fluid at 250° F. (121° C.) are presented in FIG. 3. Increased rate of VES viscosity reduction was observed with increasing amount of this oil. The product tested was Fish Oil 18:12TG, a common type of omega-3 nutritional fish oil from Bioriginal Food & Science Corporation, Saskatoon, Saskatchewan, Canada. The data show that at the concentrations tested, the VES fluid had good initial viscosity, with no noticeable effect on VES fluid viscosity over approximately the first hour at 250° F. (121° C.) for the 6.0 gptg concentration, and over approximately 4 hours for the 1.0 gptg concentration. Fish Oil 18:12TG has approximately 18% eicosapentaenoic acid (5 double carbon bond fatty acid) and 12% docosahexaenoic acid (6 double carbon bond fatty acid). Typically the more double bonds present on the fatty acid carbon chain the easier and faster the fatty acid will auto-oxidize. However, the data presented in FIG. 3 show that relatively high concentrations of certain salts can be used to slow down (decrease) the rate of auto-oxidation at 250° F. (121° C.).

EXAMPLE 4

Figure 4:
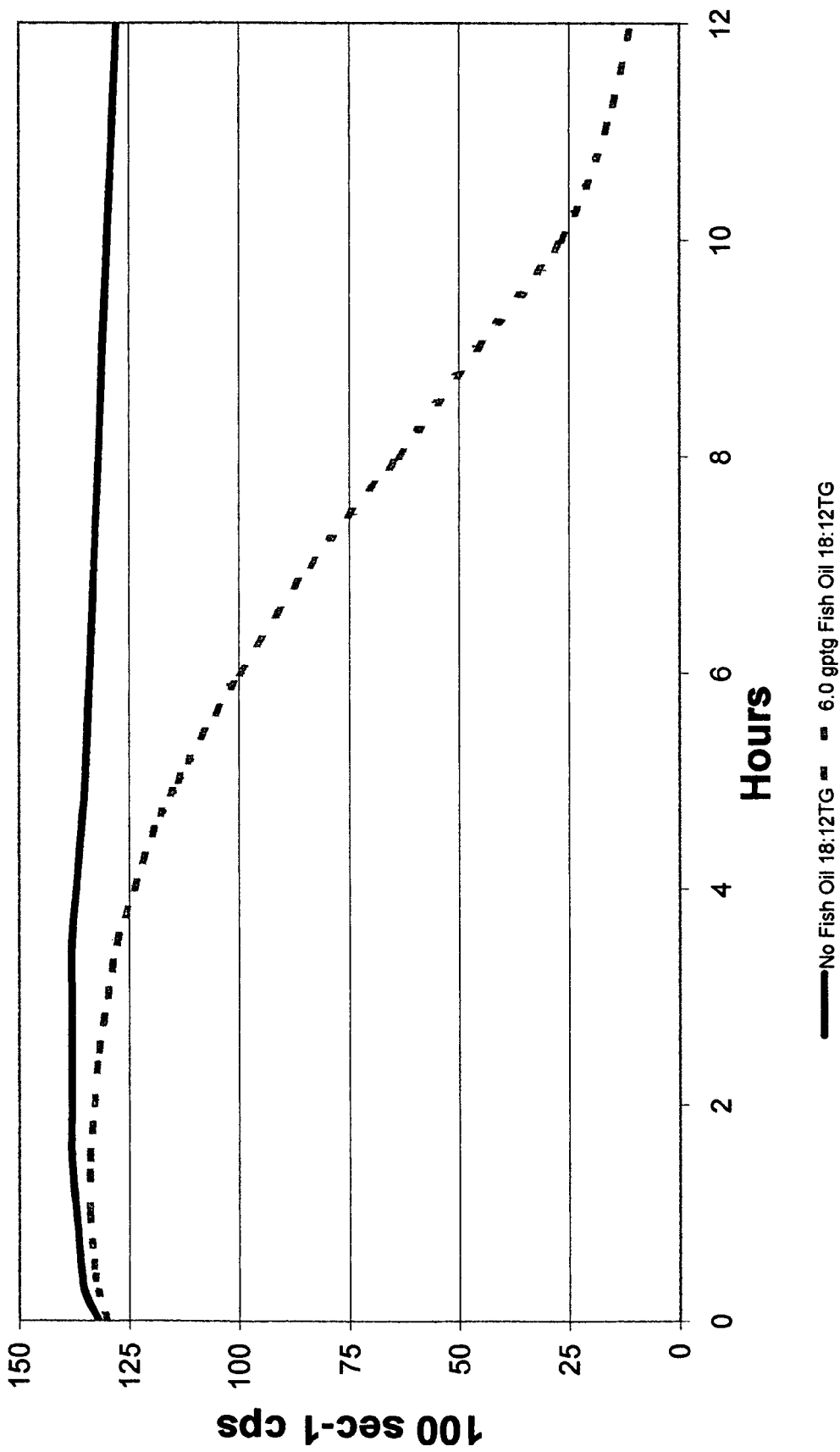
FIG. 4 is a graph showing the results of using nutritional fish oil within a WG-3L VES-gelled fluid mixed within 10.8 ppg $CaCl_2$ brine mix water at 200° F. (93° C.)

Results showing the effect of using 6.0 gptg Fish Oil 18:12TG from Bioriginal within 10.8 ppg $CaCl_2$ brine based WG-3L gelled fluid at 200° F. (93° C.) are presented in FIG. 4. The data show the VES fluid had good initial viscosity, with no noticeable effect on VES fluid viscosity over approximately 3 hours at 250° F. (121° C.). The data presented in FIG. 4 show that relatively high concentrations of $CaCl_2$ salt in the mix water slows down (decreases) the rate of auto-oxidation of a product high in 5 and 6 double carbon bonds fatty acids.

EXAMPLE 5

Figure 5:
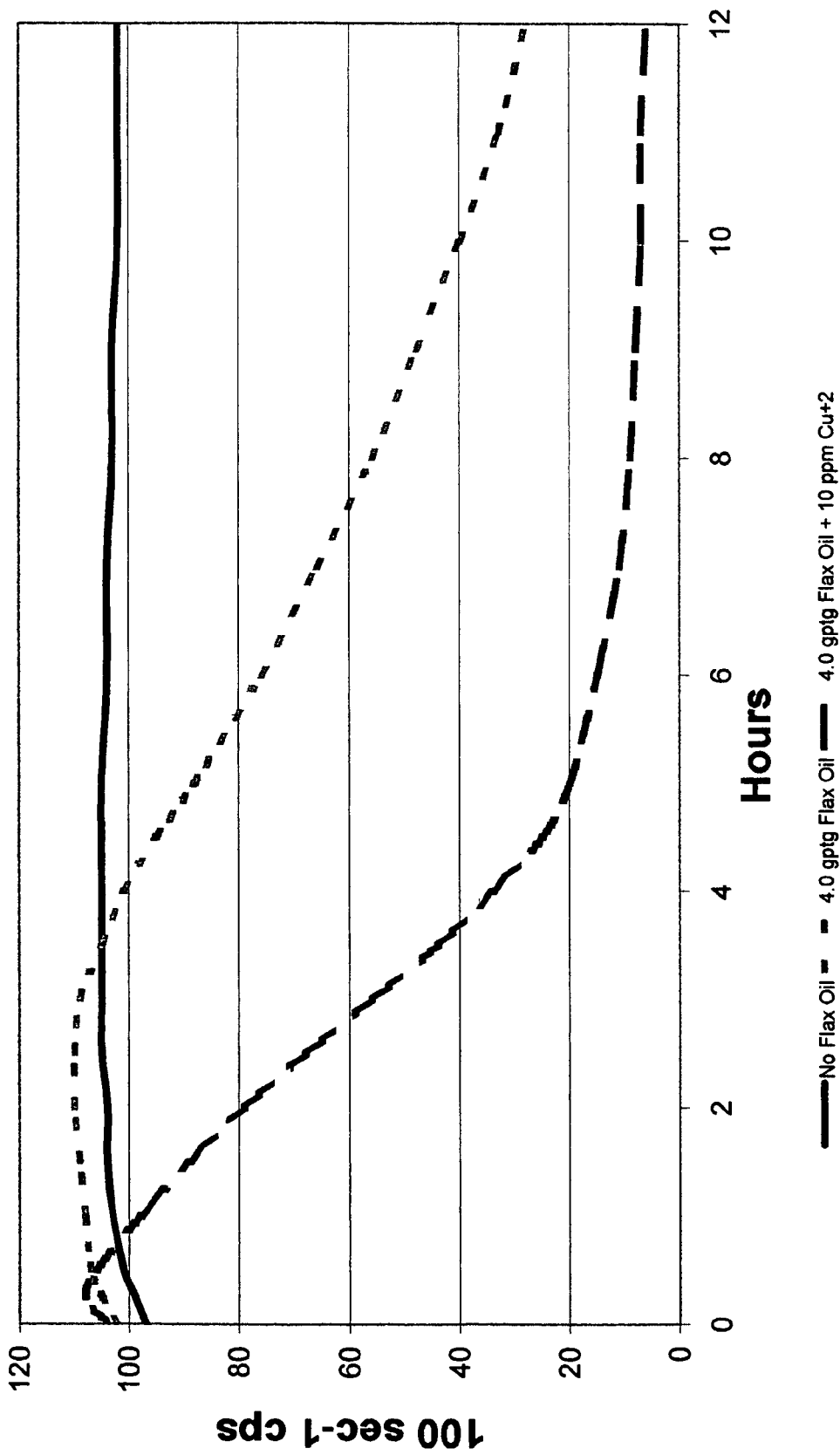
FIG. 5 is a graph showing the results on how the activity of flax oil auto-oxidation is influenced by metal ions within a WG-3L VES-gelled fluid at 150° F. (66° C.)

FIG. 5 shows the VES breaking activity of flax oil metal catalyzed and non-catalyzed within WG-3L gelled fluid at 150° F. (66° C.). The data show the VES fluid had good initial viscosity, with no noticeable effect on VES fluid viscosity over approximately 3 hours at 150° F. (66° C.) using 4.0 gptg flax oil. The test using 10 ppm of non-chelated $Cu^{+2}$ metal ions with the 4.0 gptg flax oil showed a small amount of metal ions improves the VES breaking rate, appearing to indicate that metal ions enhance the rate of auto-oxidation of UFAs. The flax oil used was Conventional Flax Oil from Bioriginal Food & Science Corporation.

EXAMPLE 6

Figure 6:
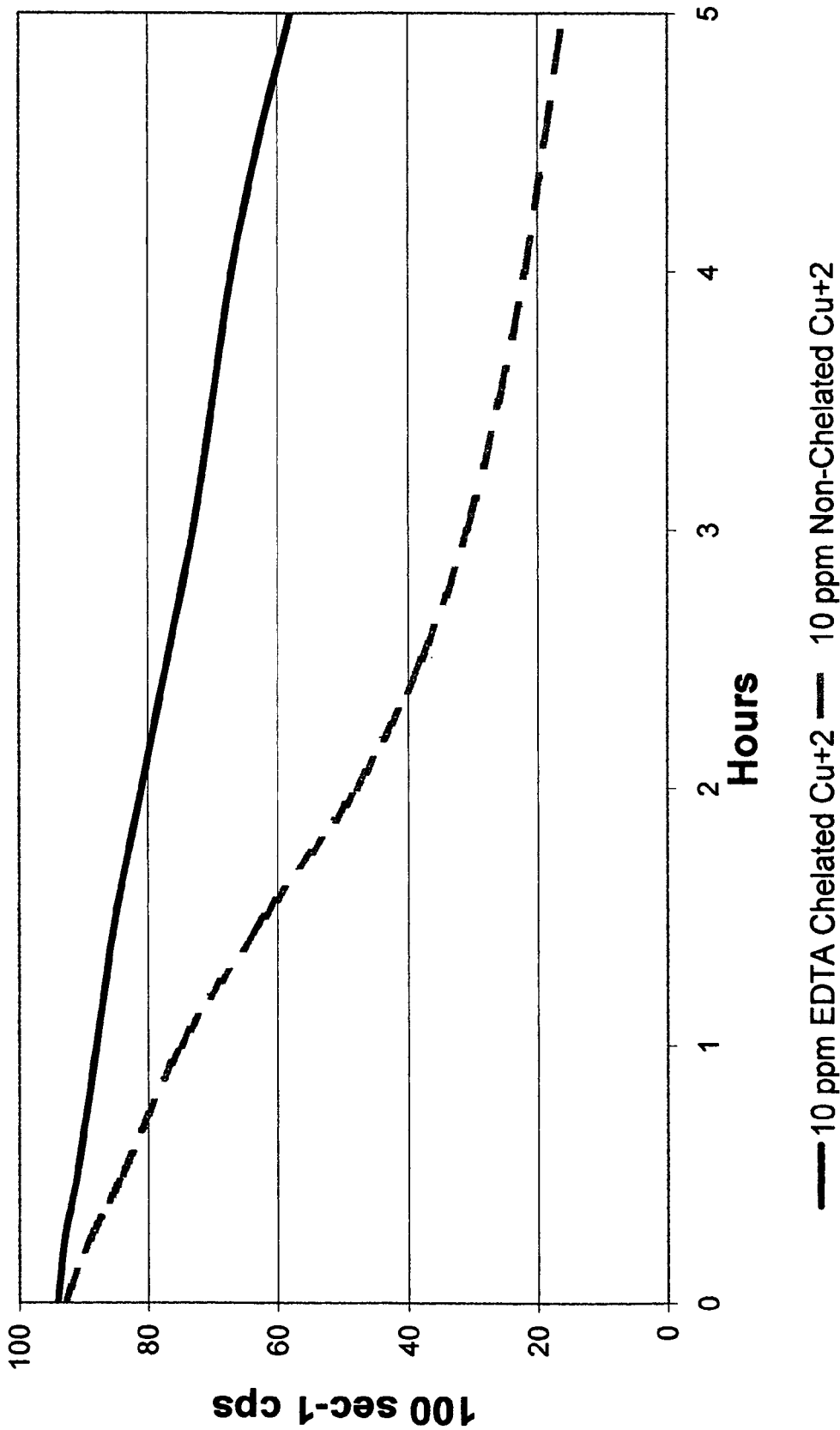
FIG. 6 is a graph showing the results on how chelation influences metal ions effects of flax and fish oil within a WG-3L VES-gelled fluid at 150° F. (66° C.)

FIG. 6 shows the activity of chelated versus non-chelated metal ions upon a mixture of UFAs within WG-3L gelled fluid at 150° F. (66° C.). The results appear to show that chelation of the metal ions slows the rate of auto-oxidation of UFAs relative to non-chelated form of the metal ions. The test used 10 ppm $Cu^{+2}$ from reagent $CuCl_2.2H_2O$, and the chelant used for the effects of chelation was reagent $Na_4EDTA$, one of the more common types of aminocarboxylic acid chelants. The UFAs used were a combination of 2.0 gptg flax oil and 1.0 gptg Fish Oil 18:12TG, both from Bioriginal. The data appears to show the activity of metal catalyst can be regulated by the use of chelants.

EXAMPLE 7

Results showing the effect of using another type of fish oil within WG-3L gelled fluid at 150° F. (66° C.) are presented in FIG. 7. Quick and complete VES viscosity reduction was observed with addition of 4.0 gptg of this oil. The product tested was nutritional supplement Salmon Oil 6:9 from Bioriginal. The data show that at the salmon oil concentrations tested, the VES fluid started to break upon heat-up, with the 2.0 gptg amount showing a slower rate of viscosity reduction over time, appearing to indicate that auto-oxidation was already initiated upon the fluid reaching 150° F. (66° C.) with the rate of auto-oxidation products generated occurring much quicker with the higher amount of salmon oil used, which also seems to indicate the VES micelle was disturbed, collapsed, and/or was rearranged more quickly and completely with the amount of auto-oxidation products generated by the 4.0 gptg versus the 2.0 gptg salmon oil concentration tests. This test appears to show that VES micelles can be disturbed, collapsed, and/or rearranged rather easily and quickly using the right type of UFA oil for a given temperature that the VES gelled fluid will be heated to. Plant, fish, and other oils appear to each have their own unique blend of unsaturated fatty acids (mono- and polyenoic acids), and it may further be possible to custom blend oils or components of oils for optimizing the rate that the UFAs within the oil will auto-oxidize for the given temperature range to be applied, the type and amount of auto-oxidized products generated, and the like.

EXAMPLE 8

FIG. 8 shows the returned permeability to 3% KCl brine for tests performed with and without UFAs breaker within WG-3L gelled fluid at 150° F. (66° C.). The results show without internal breaker the VES fluid gave a range of 50 to 60% return of the cores permeability using 3% KCl, but with UFAs as internal breakers the VES fluid gave greater than 80% return permeability, and in some cases showed stimulated regained permeabilities (i.e. greater permeabilities to 3% KCl after VES injection than before). The core clean-up tests were performed at 150° F. (66° C.) using 1" (2.5 cm) diameter by 6" (15 cm) long Ohio Berea Sandstone cores that ranged from approximately 300 to 400 millidarcies (md). The permeability of the cores were first established using 3% KCl followed by 1 hour of injection of the VES gelled fluid followed then by 16 hours of static shut-in to allow the VES fluid within the cores to break (note: the same procedure was used for the VES fluid tests without an internal breaker), and the cores were then cleaned up and the regained permeability values were generated using 3% KCl brine over a two hour flow period. The test results demonstrate that use of an internal breaker herein allows rapid and substantial clean-up of the VES fluid to occur, without the need for reservoir hydrocarbons. The tests using VES fluids without breaker appear to show a portion of the VES fluid is left within the core, impairing fluid flow, and gave return permeability valves of 50 to 60% which is comparable to the technical literature which reports 40 to 73% in brine-only saturated cores, as noted in SPE papers 30114: B. R. Stewart, et al., "Use of a Solids-Free Viscous Carrying Fluid In Fracturing Applications: An Economic and Productivity Comparison in Shallow Completions"; presented at the SPE European Formation Damage Conference, The Hague, The Netherlands, May 15-16, 1995, and 31114: J. E. Brown, et al., "Use of Viscoelastic Carrier Fluid in FracPack Applications"; presented at the SPE Formation Damage Symposium, Lafayette, La., 14-15, 1996.

EXAMPLE 9

FIG. 9 shows the results of retained proppant pack conductivity tests of WG-3L gelled fluids with and without internal breaker at 250° F. (121° C.). The results show the VES fluid without breaker gave 82.7% retained proppant pack conductivity, but with 0.5 gptg Fish Oil 18:12TG internal breaker the retained proppant pack conductivity was 101.0%. The proppant pack conductivity tests were performed at 250° F. (121° C.) using API standard procedure with Ohio Berea Sandstone wafers, 20/40 mesh sintered bauxite high strength proppant at 4 lbs/ft$^2$ (0.2 kPa), and a closure stress of 12,000 psi (83 MPa). The initial and final conductivity of the proppant pack were established using 3% KCl. The test results show that use of an internal breaker of this invention allows more rapid and complete clean-up of the VES fluid from the proppant pack to occur, without the need for reservoir hydrocarbons.

The compositions herein have been shown to break the viscosity of aqueous treatment fluids gelled with viscoelastic surfactants (VESs). As can be seen, the method of gel breaking described herein is simple, effective, safe, and highly cost-effective. Compositions and methods have been shown herein for breaking VES-surfactant fluids completely and relatively quickly. It has also been demonstrated that contact with reservoir fluids external breaking mechanism is not required for effective compositions and methods for breaking VES-surfactant fluids. VES-surfactant fluids where the breaking additive is in a phase internal to the VES-surfactant fluid have also been successfully demonstrated. It will be appreciated however, that it is not necessary for the gel to break completely or 100% for the methods and compositions of the invention to be considered successful. The methods and compositions herein also involve breaking the viscosity of aqueous fluids gelled with viscoelastic surfactants using readily available materials at relatively inexpensive concentrations.

In the foregoing specification, the methods and compositions have been described with reference to specific embodiments thereof, and have been demonstrated as effective in providing methods and compositions for a VES fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, mono- and/or polyenoic acids, compounds that can increase or decrease the rate of auto-oxidation of mono- and/or polyenoic acids, and other components falling within the claimed parameters, but not specifically identified or tried in a particular composition or fluid, are anticipated to be within the scope of this invention.

I claim:

1. A method for breaking viscosity of aqueous fluids gelled with a viscoelastic surfactant (VES) comprising
  adding to an aqueous fluid gelled with at least one viscoelastic surfactant at least one unsaturated fatty acid; and
  subjecting the fluid to a temperature effective to cause the unsaturated fatty acid to auto-oxidize to products present in an amount effective to reduce the viscosity of the gelled aqueous fluid;
where the unsaturated fatty acid is selected from the group consisting of:
  polyenoic acids selected from the group consisting of linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, conjugated polyenes, and mixtures thereof; and
  monoenoic acids selected from the group consisting of obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

2. The method of claim 1 where the products reduce the viscosity of the gelled aqueous fluid by disaggregating or rearranging a micelle structure of the VES.

3. The method of claim 1 where the effective temperature ranges from about 70 to about 300° F. (about 21 to about 149° C.).

4. The method of claim 1 where the amount of unsaturated fatty acid ranges from about 500 to about 25,000 ppm based on the total fluid.

5. The method of claim 1 where the only viscosity reducing agent added is the at least one unsaturated fatty acid.

6. The method of claim 1 further comprising adding at least one auto-oxidation rate control compound to the at least one unsaturated fatty acid.

7. The method of claim 1 where the aqueous fluid has an oil-soluble internal phase containing the at least one unsaturated fatty acid.

8. A method for breaking viscosity of aqueous fluids gelled with a viscoelastic surfactant (VES) comprising adding to an aqueous fluid gelled with at least one viscoelastic surfactant at least one unsaturated fatty acid in an amount from about 500 to about 25,000 ppm based on the total fluid; and subjecting the fluid to a temperature from about 70 to about 300° F. (about 21 to about 149° C.) to cause the unsaturated fatty acid to auto-oxidize to products present in an amount effective to reduce the viscosity of the gelled aqueous fluid by disaggregating or rearranging a micelle structure of the VES;

where the unsaturated fatty acid is selected from the group consisting of:

polyenoic acids selected from the group consisting of linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, conjugated polyenes, and mixtures thereof; and monoenoic acids selected from the group consisting of obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

9. The method of claim 8 further comprising adding at least one auto-oxidation rate control compound to the at least one unsaturated fatty acid.

10. The method of claim 8 where the aqueous fluid has an oil-soluble internal phase containing the at least one unsaturated fatty acid.

11. An aqueous fluid comprising:
water;
at least one viscoelastic surfactant (VES) in an amount effective to increase the viscosity of the aqueous fluid; and
at least one unsaturated fatty acid that auto-oxidizes and forms products present in an amount effective to reduce the viscosity of the gelled aqueous fluid when the fluid is heated to an effective temperature;

where the unsaturated fatty acid is selected from the group consisting of:

polyenoic acids selected from the group consisting of linoleic acid, omega-3 fatty acids, omega-6 fatty acids, stearidonic acid, eleostearic acid eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, conjugated polyenes, and mixtures thereof; and monoenoic acids selected from the group consisting of obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

12. The fluid of claim 11 where the products reduce the viscosity of the gelled aqueous fluid by disaggregating or rearranging a micelle structure of the VES.

13. The fluid of claim 11 where the effective temperature ranges from about 70 to about 300° F. (about 21 to about 149° C.).

14. The fluid of claim 11 where the amount of unsaturated fatty acid ranges from about 500 to about 25,000 ppm based on the total fluid.

15. The fluid of claim 11 where the only viscosity reducing agent is the at least one unsaturated fatty acid.

16. The fluid of claim 11 further comprising at least one auto-oxidation rate control compound.

17. The fluid of claim 11 further comprising an oil-soluble internal phase containing the at least one unsaturated fatty acid.

18. An aqueous fluid comprising water;
at least one viscoelastic surfactant (VES) in an amount of from about 500 to about 25,000 ppm based on the total fluid effective to increase the viscosity of the aqueous fluid; and
at least one unsaturated fatty acid that auto-oxidizes and forms products present in an amount effective to reduce the viscosity of the gelled aqueous fluid by disaggregating or rearranging a micelle structure of the VES when the fluid is heated to a temperature from about 70 to about 300° F. (about 21 to about 149° C.);

where the unsaturated fatty acid is selected from the group consisting of:

polyenoic acids selected from the group consisting of linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, conjugated polyenes, and mixtures thereof; and monoenoic acids selected from the group consisting of obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

19. The fluid of claim 18 further comprising at least one auto-oxidation rate control compound.

20. The fluid of claim 18 where further comprising an oil-soluble internal phase containing the at least one unsaturated fatty acid.

* * * * *